US 6,915,812 B2
Jul. 12, 2005

(12) United States Patent
Frohwein

(54) LOW PERMEATION WELDABLE FUEL TANK ASSEMBLY

(75) Inventor: Axel Frohwein, Treuchtlingen (DE)

(73) Assignee: Alfmeier Corporation, Greenville, SC (US)

( * ) Notice: Subject to any disclaimer, the term of this patent is extended or adjusted under 35 U.S.C. 154(b) by 70 days.

(21) Appl. No.: 10/356,380

(22) Filed: Jan. 31, 2003

(65) Prior Publication Data

US 2004/0151850 A1 Aug. 5, 2004

Related U.S. Application Data

(62) Division of application No. 09/659,305, filed on Sep. 12, 2000, now abandoned.

(51) Int. Cl.[7] .............................................. F16K 24/04
(52) U.S. Cl. ....................................... 137/202; 137/587
(58) Field of Search ................................. 137/202, 587

(56) References Cited

U.S. PATENT DOCUMENTS

| 4,212,488 A | 7/1980 | Cook |
| 4,214,767 A | 7/1980 | Davies, III |
| 4,569,637 A | 2/1986 | Tuckey |

(Continued)

FOREIGN PATENT DOCUMENTS

| EP | 0742096 A2 | 11/1996 |
| EP | 0930190 A2 | 7/1999 |
| EP | 1 179 445 | 2/2002 |
| EP | 1084889 B1 | 8/2002 |
| EP | 0941884 B1 | 2/2003 |
| EP | 1291223 A2 | 3/2003 |
| EP | 1122113 B1 | 7/2004 |
| WO | WO 01/21428 A1 * | 3/2001 |
| WO | WO 01/214428 A1 * | 3/2001 |
| WO | WO 03008224 A1 | 1/2003 |

OTHER PUBLICATIONS

PCT Search Report with mailing date of Dec. 12, 2003.
U.S. Appl. No. 10/735,998, filed Dec. 15, 2003, entitled: "Process for Production of a Hollow Body Connecting Element, Particularly a Fuel Tank".
Verified English language translation of WO 01/21428 A1, published Mar. 29, 2001.
Inergy Automotive Systems presentation dated Feb. 1, 2002.

Primary Examiner—Gerald A. Michalsky
(74) Attorney, Agent, or Firm—Dority & Manning, P.A.

(57) ABSTRACT

A low permeation weldable fuel tank assembly is provided to reduce fuel vapor mountable to the fuel tank. The weldable fuel tank assembly has a mounting portion mountable to the fuel tank and a valve housing that is attachable to the mounting portion. In one aspect, the mounting portion includes a fuel vapor permeation barrier. In another aspect, an anti-permeation cap with a fuel vapor permeation barrier is affixed to a portion of tank assembly.

24 Claims, 6 Drawing Sheets

U.S. PATENT DOCUMENTS

| | | |
|---|---|---|
| 4,905,726 A | 3/1990 | Kasugai et al. |
| 5,139,043 A | 8/1992 | Hyde et al. |
| 5,148,792 A | 9/1992 | Tuckey |
| 5,402,818 A | 4/1995 | Kasugai et al. |
| 5,404,907 A | 4/1995 | Benjey et al. |
| 5,441,781 A | 8/1995 | Uchida et al. |
| 5,443,874 A | 8/1995 | Tachi et al. |
| 5,449,018 A | 9/1995 | Harris |
| 5,449,029 A | 9/1995 | Harris |
| 5,518,018 A | 5/1996 | Roetker |
| 5,529,086 A | 6/1996 | Kasugai et al. |
| 5,535,772 A | 7/1996 | Roetker et al. |
| 5,566,705 A | 10/1996 | Harris |
| 5,577,526 A | 11/1996 | Kasugai et al. |
| 5,582,198 A | 12/1996 | Nagino et al. |
| 5,589,241 A | 12/1996 | Stiles et al. |
| 5,598,870 A | 2/1997 | Nagino |
| 5,598,872 A | 2/1997 | Kasugai et al. |
| 5,621,176 A | 4/1997 | Nagano et al. |
| 5,632,296 A | 5/1997 | Kasugai et al. |
| 5,666,989 A | 9/1997 | Roetker |
| 5,687,756 A | 11/1997 | VanNatta et al. |
| 5,687,778 A | 11/1997 | Harris |
| 5,694,968 A | 12/1997 | Devall et al. |
| 5,789,679 A | 8/1998 | Koshimizu et al. |
| 5,803,131 A | 9/1998 | Iwasa et al. |
| 5,944,044 A | 8/1999 | King et al. |
| 5,975,116 A | 11/1999 | Rosas et al. |
| 6,035,883 A * | 3/2000 | Benjey ................ 137/202 |
| 6,035,884 A | 3/2000 | King et al. |
| 6,037,062 A | 3/2000 | Tsutsumi et al. |
| 6,058,963 A | 5/2000 | Enge et al. |
| 6,170,510 B1 | 1/2001 | King et al. |
| 6,189,567 B1 | 2/2001 | Foltz |
| 6,240,950 B1 | 6/2001 | Harris |
| 6,286,539 B1 * | 9/2001 | Nishi et al. ............ 137/202 |
| 6,289,915 B1 * | 9/2001 | Nulman et al. ......... 137/202 |
| 6,305,568 B1 * | 10/2001 | Suzuki et al. .......... 220/562 |
| 6,408,867 B2 * | 6/2002 | Aoki et al. ............ 137/202 |
| 6,422,261 B1 * | 7/2002 | DeCapua et al. ....... 137/202 |
| 6,431,200 B2 | 8/2002 | Brock et al. |
| 6,508,263 B1 | 1/2003 | Jahnke et al. |
| 6,733,048 B2 * | 5/2004 | Kurihara et al. ....... 137/202 |
| 6,843,267 B1 * | 1/2005 | Van Schaftingen et al. . 137/202 |
| 2002/0011490 A1 * | 1/2002 | Nakamura et al. ...... 220/4.12 |
| 2003/0015235 A1 | 1/2003 | Spink |
| 2003/0015526 A1 | 1/2003 | Nakaya et al. |
| 2003/0066558 A1 | 4/2003 | Muto et al. |
| 2004/0124567 A1 * | 7/2004 | Stangier ............... 264/523 |

* cited by examiner ent of a component in the form of an insert which is adapted for lining a connection opening of a fuel tank and/or to form a seat for a connection element.

LOW PERMEATION WELDABLE FUEL TANK ASSEMBLY

CROSS-REFERENCE TO RELATED APPLICATION

This is a division of U.S. application Ser. No. 09/659,305, filed Sep. 12, 2000, now abandoned, the disclosure of which is incorporated herein by reference.

BACKGROUND OF THE INVENTION

The invention concerns generally a process for the production of a connecting element of thermoplastic material for connection to a hollow body also of thermoplastic material, and more particularly, but not exclusively, production of a component in the form of an insert which is adapted for lining a connection opening of a fuel lank and/or to form a seat for a connection element.

A fuel tank, for example for a motor vehicle, may typically include a component which lines a connection opening of the tank and/or which forms a seat for a connection element. Connection elements in that respect may be, for example, valves, nipples, connection sleeves and like members. Furthermore, a connection opening of the tank can be designed to accommodate a delivery or conveyor unit or it can be in the form of a sender opening for accommodating a sender for indicating the level of fuel in the tank, or in the form of a lead-in tube connection.

High demands are to be made on fuel tanks, in terms of their permeability in relation to hydrocarbons. In accordance with the most recent regulations relating to environmental protection, the total level of hydrocarbon emissions of a vehicle in the non-operating condition are to be not more than 0.5 g in a period of 24 hours. Correspondingly high demands are to be made in terms of the maximum level of hydrocarbon emission of a fuel tank system. For that reason fuel tanks may often be made by a co-extrusion blow molding process. wherein the wall thereof consists of a laminate with one or more barrier layers affording a low level of permeability to hydrocarbons. Such tanks generally satisfy the enhanced demands in regard to the maximum permissible levels of hydrocarbon emissions.

Problems are involved in this respect however in regard to the connection openings in the tank, which form a sealing seat for valves, connection portions and the like. As such connection openings have to involve close tolerances in order for example to guarantee a sufficiently sealing and play-free fit of a connection portion or valve therein, it is in many cases not possible to also provide the valve seat or sealing seat for the connection component in one working operation in production of the tank by extrusion blow molding.

Accordingly, an opening is provided in the tank, to act as the connection opening. There are now various possible ways of inserting, for example, a valve into that opening in sealing relationship therewith. On the one hand, there is the possibility of screwing the valve against the tank wall, with the interposition of seals, which also bear against the tank wall structure. That arrangement is unsuitable for fuel tanks by virtue of the enhanced demands in terms of sealing integrity of the tank. Welding the valve to the tank also cannot be readily considered as valves and connection portions generally consist of POM (polyoxymethylene), in particular because of the need for the material to be resistant to the fuel, whereas the tank at least partially comprises PE (polyethylene). The various materials involved are not weldable to each other.

For that reason, nipples or valves consisting of POM may be provided with a stem which is injection-molded from PE and into which the valve or the connection nipple is fitted by clipping engagement. The stem can then be welded to the tank in the region of the connection opening thereof, for example by means of a hot plate welding procedure.

That manner of manufacture, however, still suffers from the disadvantage that the connection opening of the tank represents a weak point in regard to the possible emission of hydrocarbons as PE (polyethylene) is permeable in relation to hydrocarbons and swells up in the presence thereof whereas POM (polyoxymethylene) is scarcely pervious to hydrocarbons. A connection opening in the tank therefore still constitutes a source of emissions.

BRIEF SUMMARY OF THE INVENTION

An object of the present invention is to provide a connecting element for insertion into a connection opening, for example an insert for a connection opening, which affords reduced hydrocarbons permeability, so that in use, for example, in a fuel tank the overall levels of hydrocarbon emissions of the tank are reduced.

Another object of the present invention is to provide an insert of thermoplastic material for use in conjunction with a fuel tank, such as to ensure compatibility between the materials involved and to provide a rational and readily implementable operating procedure for production of the assembly of such components.

Still a further object of the present invention is to provide an insert of thermoplastic material for connection to a hollow body of thermoplastic material, which is simple to produce while affording versatility of design configuration and operational function.

Yet a further object of the present invention is to provide a process for producing an insert for connection to a fuel tank of thermoplastic material, which is simple to implement and which can afford an insert of suitable nature for connection to a fuel tank affording low hydrocarbon-permeability.

In the insert aspect in accordance with the principles of the present invention the foregoing and other objects are attained by an insert of thermoplastic material for connection to a hollow body of thermoplastic material, for example in the form of a component for lining a connection opening of a fuel tank and/or for forming a seat for a connection element, wherein the insert is produced by press shaping of a laminate of low permeability for hydrocarbons.

It will be noted at this point that the term "press shaping" is used in accordance with the sense of the present invention to denote shaping an article of softened thermoplastic material, either in the form of an extrudate or in the form of a semi-finished article in softened form, in a mold which comprises a plurality of parts, preferably a two-part mold, consisting of a male mold portion and a female mold portion.

In accordance with a preferred feature of the invention the insert is adapted to be connected to a fuel tank by a connection involving intimate joining of the materials concerned, preferably being weldable thereto. That is guaranteed, in particular, if the insert comprises the same laminate as the tank. For connecting the insert to the fuel tank, a hot plate welding procedure, butt welding or sealing with heat reflectors or friction welding can be considered as appropriate welding processes, with hot plate welding being preferred.

Preferably, the insert comprises a laminate having at least one barrier layer for hydrocarbons. The barrier layer or layers can be at least almost completely embedded into the material of the insert. Preferably, the laminate has first and second barrier layers.

In a preferred feature, the barrier layers can be embedded in a main body, which substantially comprises polyethylene. This ensures that the main body is weldable to the material of the tank. The barrier layers should be arranged to extend in the material in such a way that, upon welding of the insert to the tank, they adjoin as closely as possible the barrier layers, which extend in the wall structure of the tank. Moreover, it is desirable for the barrier layers as far as possible to extend in the proximity of the inside wall of the insert, at an angle with respect to the longitudinal axis of the insert of an elongate configuration, so that migration of fuel around the barrier layer or layers can be very substantially prevented.

A further preferred feature of the invention provides that the barrier layer or layers comprises or comprise EVOH (ethylene vinyl alcohol). A container which is produced by a co-extrusion blow molding process is to be found for example in DE 43 37 491 A1 to which reference is directed in terms of the full content thereof in regard to structure and lamination of the extrudate.

In the process aspect in accordance with the present invention the foregoing and other objects of the invention are attained by a process for producing an insert for sealing and non-releasable connection to a fuel tank of thermoplastic material, wherein the insert is obtained by press shaping of a laminate with a low level of permeability for hydrocarbons.

Depending on the nature of the layer structure of the laminate used the finished insert may preferably include one or more barrier layers. Furthermore, the configuration of the one or more barrier layers in the insert is also dependent on the nature of the pressing tool, for example the position of the pressing tool division or the closing or squeeze-off portions of the tool.

Preferably a multi-layer preform is co-extruded and put into its definitive form by pressing in its first heat.

It is particularly desirable in accordance with the invention if the preform is extruded in the form of a tube having oppositely disposed walls, which are pressed against each other in the pressing molding operation. Such a tube is also extruded for example to produce the tank so that ultimately the insert can be produced using the same extrusion technology, simply requiring a different tool for producing the insert.

It will be appreciated that it is also possible to produce the insert from the scrap which occurs from the left-over portions of the tube in production of the tank using a co-extrusion blow molding process and which is cut off the tank after the blow molding procedure. That can be implemented in one working operation upon closure of the blow molding mold so that, when the blow molding mold is opened, the insert which has already been press shaped in the mold is obtained, besides the tank. For that purpose the blow molding mold is provided outside the mold cavity with the mold portions required for shaping the insert, that is to say, a male mold portion and a female mold portion.

Further objects, features and advantages of the invention will be apparent from the description hereinafter of preferred embodiments of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
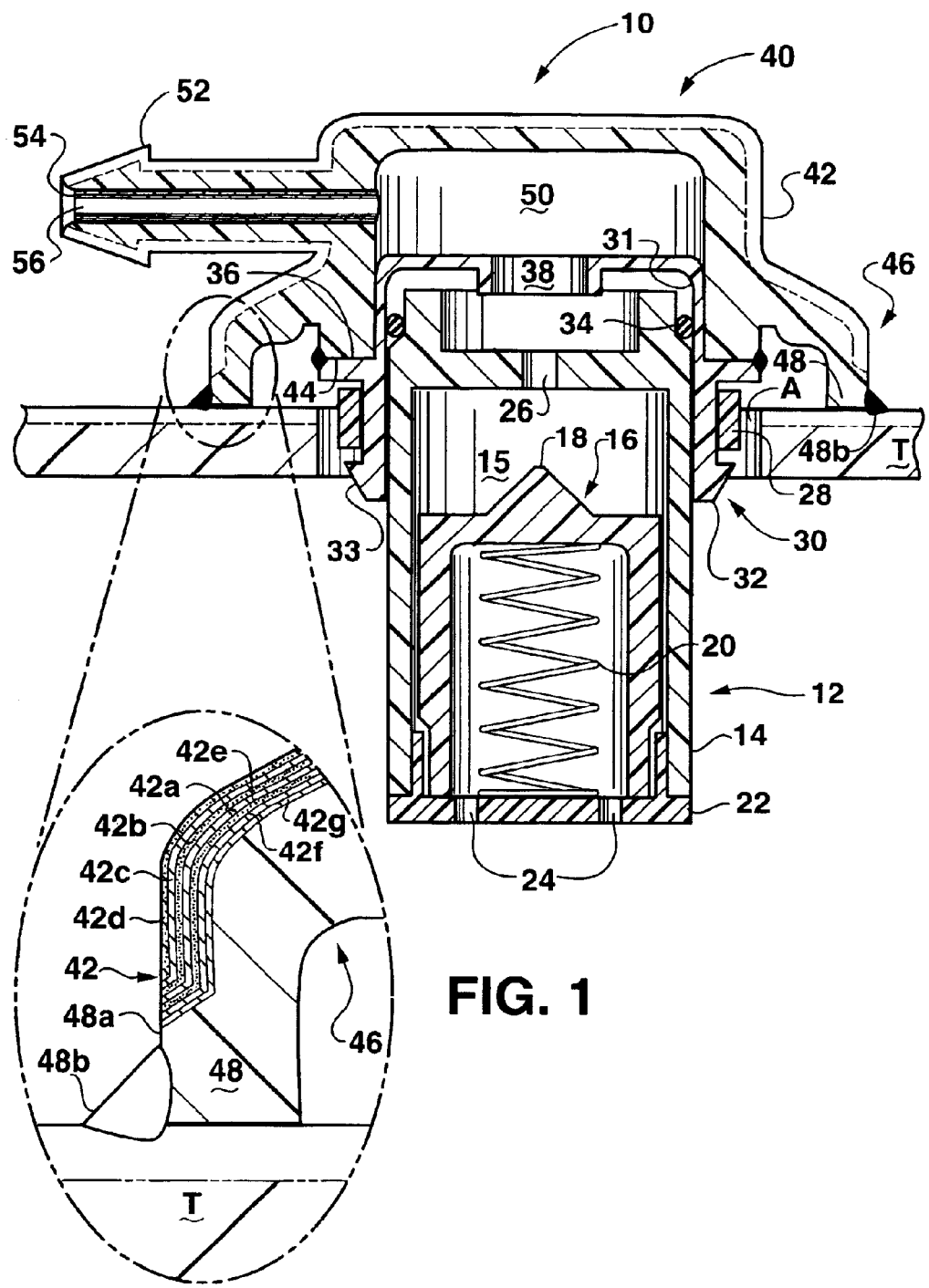
FIG. 1 is a partly sectional view of a first embodiment of an insert according to the invention, which is welded to a tank and which has a valve fitted into the insert.

Referring first to FIG. 1, reference numeral 1 therein generally denotes a first embodiment of an insert according to the invention, in the form of a hollow-cylindrical annular element having a cylindrical portion 2 and a collar 4 which forms a support flange 3.

Reference numeral 5 denotes the wall of a fuel tank which is produced by a co-extrusion blow molding process and to which the collar 4 of the insert 1 is welded in the peripheral region of a connection opening indicated generally at 6. The wall 5 of the fuel tank comprises a laminate, which is of low permeability in relation to hydrocarbons, with at least one barrier layer 7 of EVOH (ethylene vinyl alcohol). The barrier layer 7 provides a barrier action to prevent hydrocarbons from passing through the wall 5 of the tank.

Figure 2:
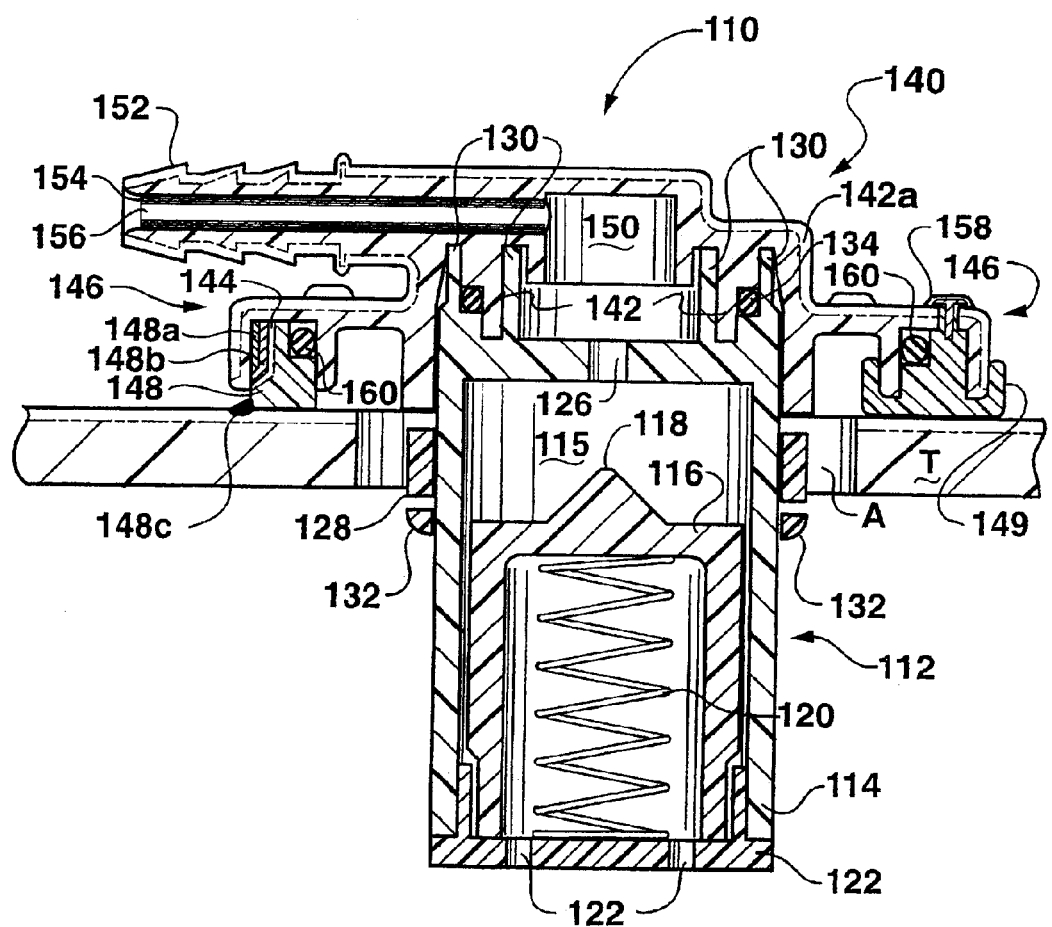
FIG. 2 is a sectional view of a second embodiment of an insert welded to a tank.

The insert 1 shown in FIG. 1 and also in FIG. 2 also comprises a laminate which involves low permeability for hydrocarbons, with at least one barrier layer 7. The embodiments illustrated in FIGS. 1 and 2 differ from each other insofar as the configuration of the barrier layer 7 in each of the two structures is selected to be different. It will be seen therefore that, in the embodiment shown in FIG. 1, the barrier layer 7 extends in the region of the cylindrical portion 2 of the insert 1 at an angle relative to the longitudinal axis of the insert 1 and is disposed at the lower end of the cylindrical portion 2 in the proximity of the inside wall 13 thereof. In the region of the collar 4 the barrier layer projects slightly above the support flange 3.

In the second embodiment of the invention as shown in FIG. 2, on the other hand, the barrier layer 7 more ideally firstly extends as closely as possible to and parallel to the inside wall indicated at 13 in FIG. 1 of the insert 1. In the region of the collar 4 the barrier layer 7 extends as closely as possible to the outside of the insert 1 and ends fairly precisely in the outer corner region of the support flange 3.

Figure 3:
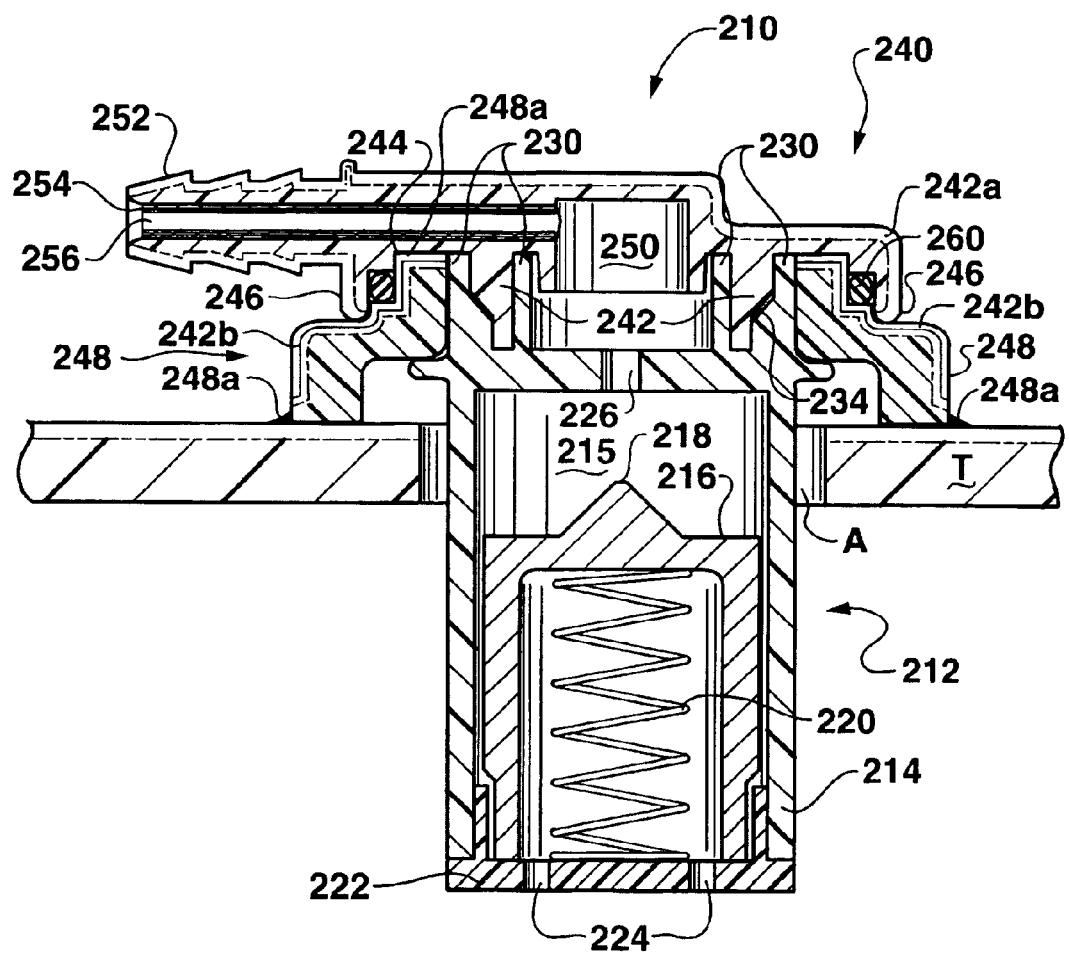
FIG. 3 is a sectional view of a third embodiment of an insert.

Referring now to FIG. 3, the third embodiment of the insert 1 according to the invention as shown therein has a total of two barrier layers 7. The precise layer structure of the insert 1 of the FIG. 3 embodiment can be seen in greater detail from FIG. 7 to which further reference will be made below.

As the basic material of the insert 1 and also the tank is polyethylene, which swells in the presence of hydrocarbons, the insert 1 is provided with a metal support ring 8 which prevents a change in shape in the sense of an increase in the diameter of the insert 1, by virtue of the absorption of hydrocarbons, and which surrounds the insert 1 in a sleeve-like fashion. If the insert 1 should swell due to the presence of hydrocarbons thereat, then the insert 1 can only deflect or escape in an inward direction because of the existence of the metal support ring 8 forming a kind of hooping member around the insert 1, so that the connection to the wall 5 of the tank is not adversely affected. In addition the component which is disposed in the insert 1, for example a valve or some other component, does not experience any adverse effects in regard to its seat in the insert and the sealing integrity that is involved therewith.

In the embodiment of FIG. 1 the insert 1 is shown as serving as a sealing seat for a valve 9 of POM (polyoxymethylene). The valve 9 has a cylindrical main body 10 whose outside contour and whose outside diameter approximately correspond to the inside contour and the inside diameter of the insert, more specifically with a comparatively high level of dimensional accuracy. The main body 10 of the valve 9 is non-releasably latched to the insert 1 by way of retaining projections or catches 11. The valve 9 is sealed off in relation to the insert 1 by means of two 0-ring seals 12, one of the 0-ring seals being intended for the low-temperature range and the other for the high-temperature range.

As FIG. 2 in particular shows, the barrier layer 7 in the region of the support flange 3 is as far outward as possible in order to ensure, when the support flange 3 is welded to the wall 5 of the tank, that the barrier layer 7 of the insert 1 is connected to the barrier layer 7 of the wall 5 of the tank. At any event the barrier layer 7 should be embedded into the basic material of the insert 1 in order to be protected from physical damage.

Figure 4:
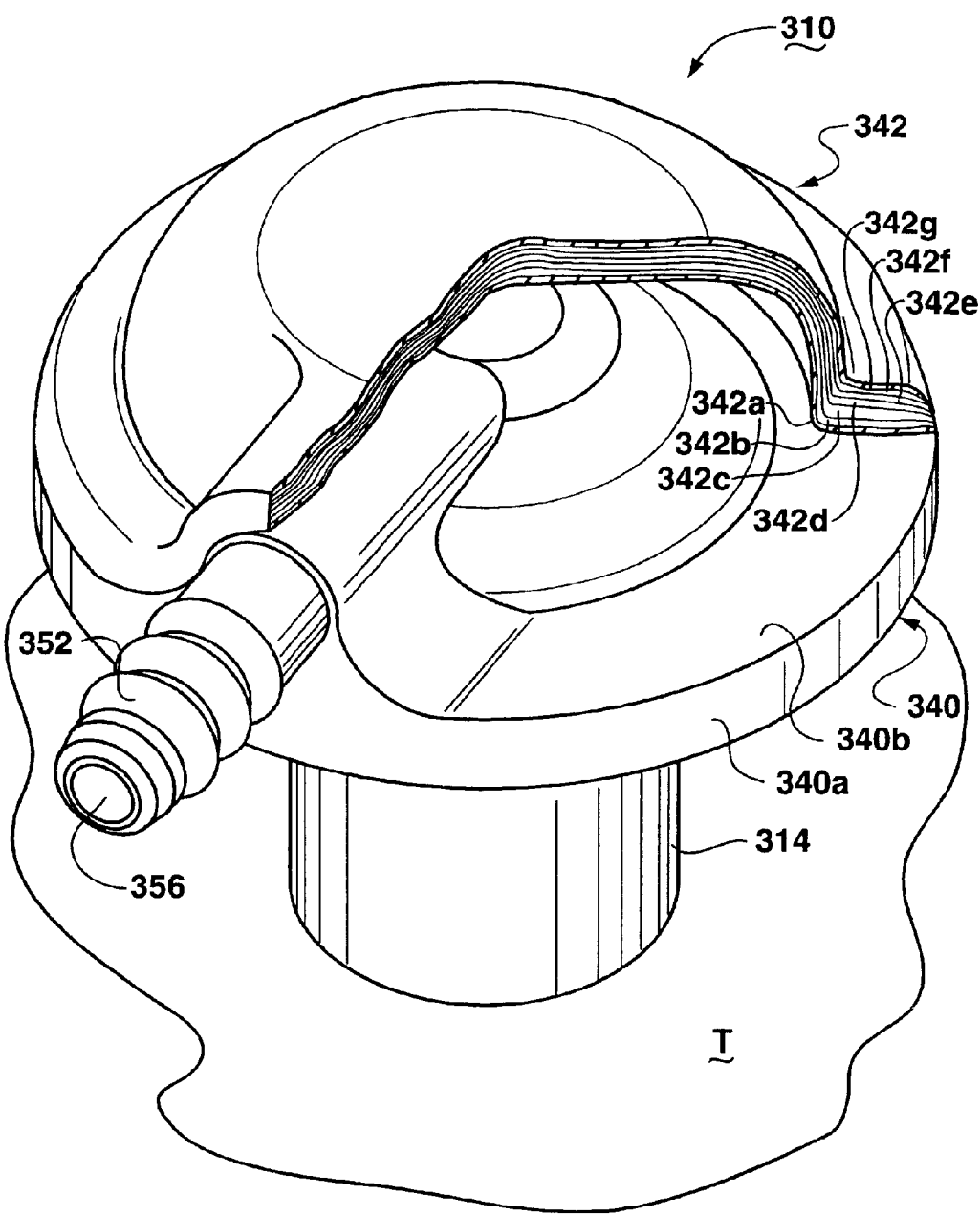
FIG. 4 is a sectional view of a fourth embodiment of an insert, with an angle connection portion fitted therein.

The insert 1 shown in FIG. 4 is illustrated as receiving an angle connection portion 14 of POM (polyoxymethylene), instead of accommodating a valve. It will be noted here that, in regard to all the illustrated embodiments, the insert 1 shown is of a comparatively simple configuration having a smooth inside wall 13, with either the angle connection portion 14 or the valve 9 being non-releasably latched to the insert 1. It is likewise conceivable for the insert 1 to be provided with a profiled internal wall, for example in the form of a screw thread, so that the connection element in question can be screwed to the insert 1.

Figure 5:
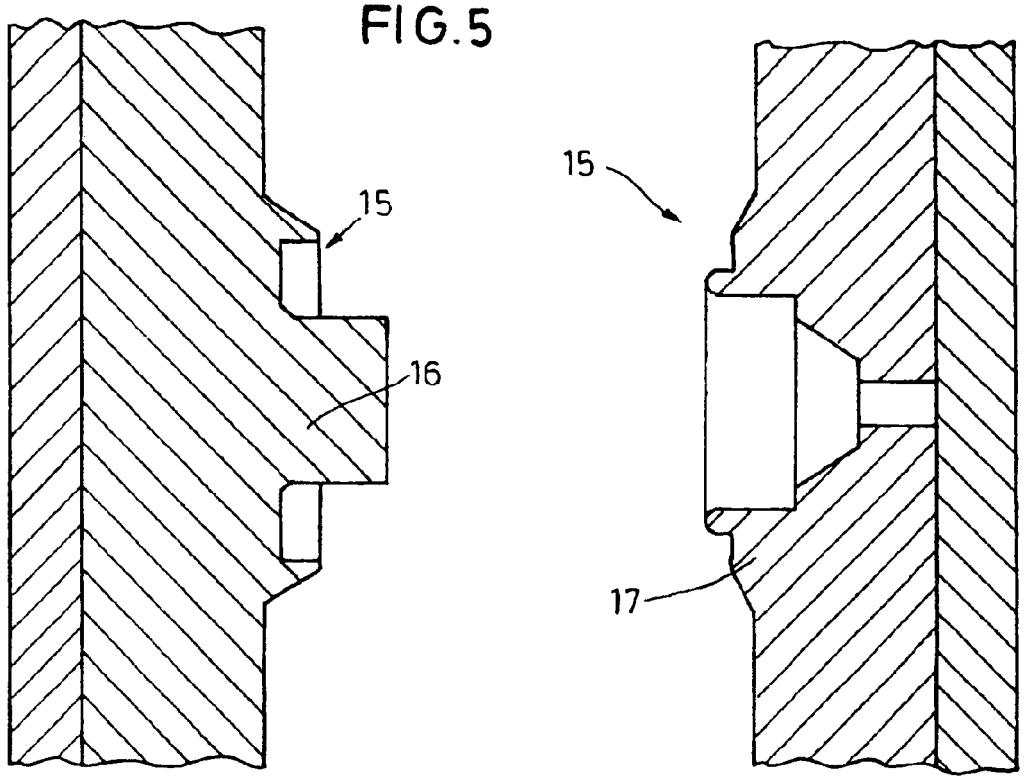
FIG. 5 shows a sectional view of an opened press shaping mold.
Figure 6:
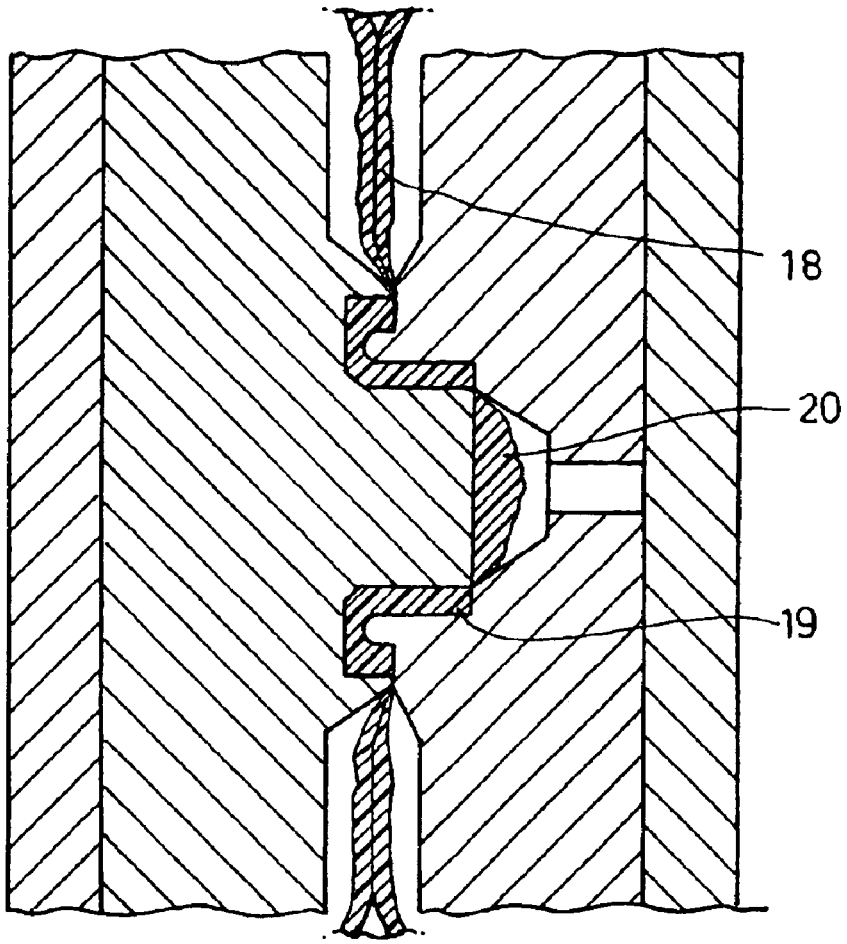
FIG. 6 shows a sectional view of the press shaping mold of FIG. 5 in the closed condition.

Reference will now be directed to FIGS. 5 and 6 diagrammatically showing the procedure for producing the insert 1. Reference numeral 15 denotes a mold or tool consisting of first and second parts, namely a male mold portion 16 and a female mold portion 17, which together form the pressing mold for producing the insert by a pressing shaping procedure. In accordance with the preferred form of the process, it is provided that the insert 1 is produced by extrusion of a multilayer tube indicated at 18, using a co-extrusion procedure, with the tube 18 then being introduced into the tool 15 in the opened condition, as shown in FIG. 5.

The parts of the mold tool 15, that is to say the male mold portion 16 and the female mold portion 17, are moved towards each other, with the tube 18 filling the cavity 19 of the tool 15, as shown in FIG. 6. The closing forces, which are applied to the male mold portion 16 and the female mold portion 17, cause the excess material to be partially squeezed off and separated and partially driven into a compensating chamber 20. The tube, which is preferably co-extruded from six layers, is pressed together to form a structure which overall consists of twelve layers.

After the insert 1 is removed from the mold, the compensating volume of molded material, which is still attached thereto and which was produced by being expelled into the compensating chamber 20, as well as the lateral flash portions outside the mold cavity of the molding tool, have to be removed.

Figure 7:
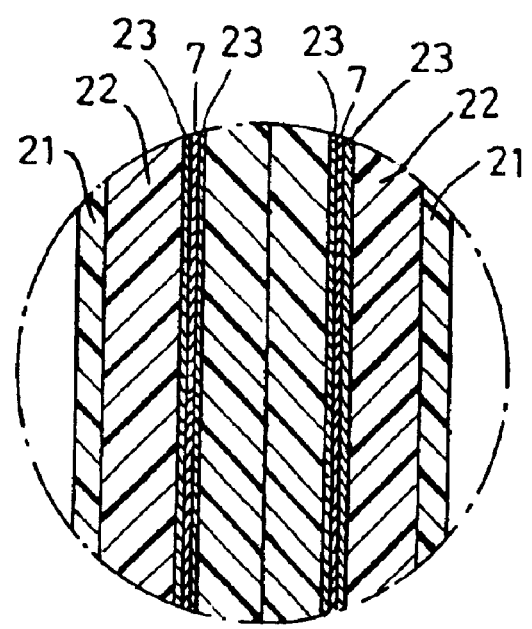
FIG. 7 is a view on an enlarged scale of the portion indicated at VII in FIG. 3.

The finished insert of the structure is diagrammatically shown in FIG. 7, consisting of a total of twelve parallel layers, of which the two outer layers, as indicated at 21, comprise for example polyethylene, each then being adjoined by respective layers 22 of regenerated material. The term regenerated material is used to denote recycled material, which has occurred for example as scrap in production of the tank or in production of the insert 1.

The barrier layers 7, which comprise EVOH (ethylene vinyl alcohol), are respectively embedded into a primer or bonding layer 23 which ensures a join of the barrier layers 7 to the recycled material layers 22 or the outer layers 21 of polyethylene.

Production of the insert by way of a co-extruded tube, as indicated at 18 in FIG. 6, affords the structure involving a total of twelve layers, with all layers thereof being present at least in duplicate. The twelve-layer structure of the insert 1 is embodied only in the configuration shown in FIG. 3, in which there are a total of two barrier layers 7.

It will be noted that an insert as described hereinbefore in accordance with the invention has the advantage, over an insert which is only injection-molded from polyethylene, that it affords reduced permeability in relation to hydrocarbons on the one hand, while on the other hand such an insert according to the invention is comparatively simple to produce, for example using the multi-layer extrudate, which is present in any case in the manufacture of a tank by means of a co-extrusion blow molding process. It will be appreciated that as an alternative in relation thereto, it is possible, for producing the insert, to use a plate-shaped multi-layer semi-finished product or excess extrudate which occurs in blow molding of the tank.

It will be appreciated that the above-described configurations of the insert according to the invention and the process for production thereof in accordance with the invention have been set forth solely by way of example and illustration of the principles of the invention and that various other modifications and alterations may be made therein without thereby departing from the spirit and scope of the invention.

That which is claimed is:

1. A fuel system apparatus for weldable attachment to a fuel tank, the fuel system apparatus comprising:
   a mounting portion defining a passageway in communication with an inside of the fuel tank, the mounting portion including a laminate having multiple layers including a weldable layer, the laminate configured to block fuel vapor permeation from about the mounting portion, the mounting portion further including a weld foot defining an exterior side and an interior side, the sides configured for welding to a surface of the fuel tank at respective weldpoints, the laminate being disposed at least within the weld foot and configured within the weld foot such that the sides of the weld foot are welded to the fuel tank surface at the respective weldpoints, the laminate being spaced apart from the weldpoints; and
   a valve assembly attached to the mounting portion and at least partially disposed in the inside of the fuel tank and configured to selectively open or close communication between the passageway to the inside of the fuel tank.

2. The fuel system apparatus of claim 1, wherein the laminate is disposed on the weldable layer spaced apart from the surface of the fuel tank.

3. The fuel system apparatus of claim 1, wherein the laminate is selected from the group consisting of a polymer, a metal, an adhesive, an anti-permeation material, and combinations thereof.

4. The fuel system apparatus of claim 3, wherein the polymer is one of an HDPE or a conductive HDPE.

5. The fuel system apparatus of claim 3, wherein the anti-permeation material is EVOH.

6. The fuel system apparatus of claim 1, wherein the mounting portion is comprised substantially of the laminate and defines a mounting surface and further including an interface disposed between the mounting surface and the valve assembly, the interface having a complementary surface configured for attachment to the mounting surface.

7. The fuel system apparatus of claim 6, wherein the mounting portion defines an extension spaced apart from the interface with the weldable layer forming a portion of the weldable extension, the laminate disposed on the weldable extension such that the laminate is spaced apart from the surface.

8. The fuel system apparatus of claim 6, further comprising means for sealing the valve assembly and the interface together.

9. The fuel system apparatus of claim 8, wherein the means for sealing is selected from the group consisting of an o-ring, a sealant, a gasket, and combinations thereof.

10. The fuel system apparatus of claim 1, wherein the mounting portion is unitarily formed with the weld foot.

11. The fuel system apparatus of claim 1, wherein the laminate is only in the weld foot.

12. The fuel system apparatus of claim 1, wherein the mounting portion defines a nozzle having an outlet and a sleeve disposed in the nozzle, the outlet in communication with an atmosphere external to the fuel tank, the sleeve configured to increase a rigidity of the nozzle.

13. A fuel vapor control valve for weldable attachment to a fuel tank, the fuel vapor control valve comprising:
   a mounting portion connectable to a surface of the fuel tank, the mounting portion defining a passageway in communication with an inside of the fuel tank, the mounting portion having a weld foot defining an exterior side and an interior side, the weld foot sides weldable to a surface of the fuel tank;
   a valve assembly attached to the mounting portion for selectively opening and closing the flow through the passageway; and
   an anti-permeation portion attached to and substantially covering the mounting portion spaced apart from the weld foot sides welded at the surface, wherein the anti-permeation portion is configured to block fuel vapor permeation from the fuel tank, the anti-permeation portion comprising a multi-layer laminate.

14. The fuel system apparatus of claim 13, wherein the laminate is made from a material selected from the group consisting of a polymer, a metal, an adhesive, an anti-permeation material, and combinations thereof.

15. The fuel system apparatus of claim 13, wherein the mounting portion defines a nozzle having an outlet in communication with an atmosphere apart from the fuel tank, the multi-layer laminate disposed on the nozzle such that the fuel vapor permeation is reduced from the nozzle.

16. The fuel system apparatus of claim 13, further comprising a nozzle having an outlet in communication with an atmosphere apart from the fuel tank, wherein the nozzle is configured for connection to the mounting portion and to a fuel vapor recovery canister spaced apart from the fuel tank.

17. The fuel system apparatus of claim 16, wherein the nozzle includes a sleeve disposed in the nozzle, the sleeve configured to increase a rigidity of the nozzle.

18. The fuel system apparatus of claim 14, wherein the anti-permeation portion includes EVOH.

19. A method for attaching an anti-permeation portion to a fuel vapor control valve for weldable attachment to a fuel tank, the method comprising the steps of:
   a) providing a mounting portion connectable to a surface of the fuel tank, the mounting portion having a weld foot defining an exterior side and an interior side, the sides weldable to the surface;
   b) extruding an anti-permeation portion with the mounting portion; and
   c) attaching the mounting portion such that the anti-permeation portion is spaced apart from the surface and the weld foot sides are welded to the surface, wherein the anti-permeation portion is configured to block fuel vapor permeation from the fuel tank, the anti-permeation portion comprising a multi-layer laminate.

20. The method as in claim 19, wherein the attaching step is selected from one of a welding step, an adhesive step, a mechanical affixation step, and combinations thereof.

21. The method as in claim 19, wherein the multi-layer laminate includes EVOH.

22. The method as in claim 19, further including the step of welding the weld foot to the surface of the fuel tank.

23. The method as in claim 19, further including the step of inserting a nozzle in the mounting portion subsequent to or substantially simultaneously with attaching the anti-permeation portion.

24. The method as in claim 23, further including the step of inserting a sleeve in the nozzle, the sleeve configured to increase a rigidity of the nozzle.

* * * * *